United States Patent [19]

Dölz

[11] 4,121,125
[45] Oct. 17, 1978

[54] PLUNGER COMPRESSOR

[76] Inventor: Heinrich Dölz, Berliner Strasse 66, D-6368 Bad Vilbel, Fed. Rep. of Germany

[21] Appl. No.: 748,530

[22] Filed: Dec. 8, 1976

[30] Foreign Application Priority Data

Dec. 24, 1975 [DE] Fed. Rep. of Germany ....... 2558667

[51] Int. Cl.² .......................................... H02K 33/18
[52] U.S. Cl. ..................................... 310/27; 417/416
[58] Field of Search ............................. 417/416–418; 310/27, 13

[56] References Cited

U.S. PATENT DOCUMENTS

| | | | |
|---|---|---|---|
| 3,781,140 | 12/1973 | Gladden | 417/417 X |
| 3,903,438 | 9/1975 | Dolz | 310/27 |
| 4,002,935 | 1/1977 | Brauer | 417/416 X |

Primary Examiner—Donovan F. Duggan

[57] ABSTRACT

The invention relates to an oscillating electrodynamic compressor having an electromagnetic drive which maintains a radial magnetic field in an annular gap in which a coil is arranged for axial contactless movement. The coil is mounted on a plunger guided inside a bore of a cylinder member forming the compressor. The plunger and coil unit is held in position by a pair of vibrating springs so as to provide a resilient support bearing on the one hand on the magnet drive and on the compressor on the other hand. The springs overlap the cylinder so that the planes in which the springs bear against the plunger and coil unit intersect the cylinder bore guide for the plunger even during the stroke of the plunger.

12 Claims, 4 Drawing Figures

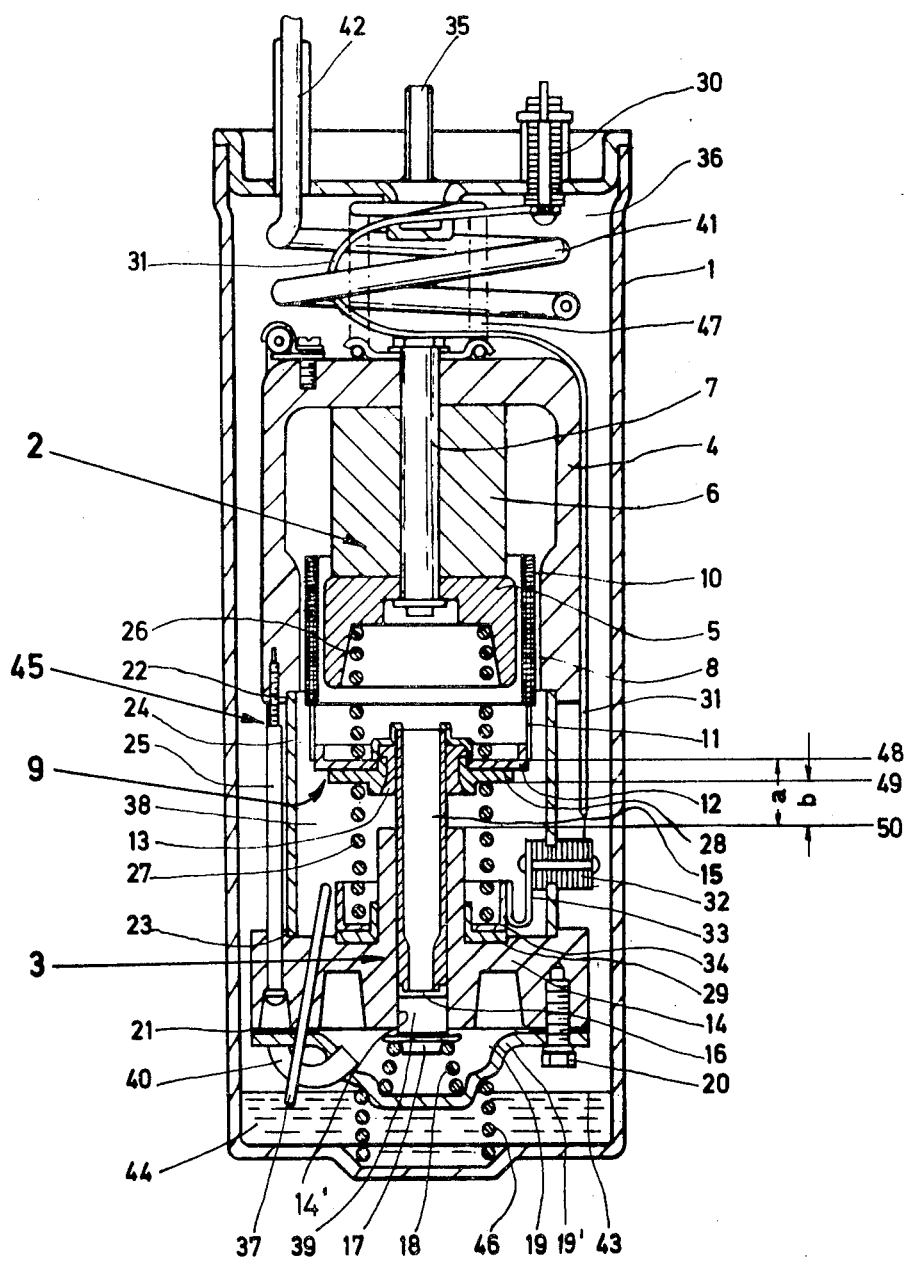
PRIOR ART   Fig. 1

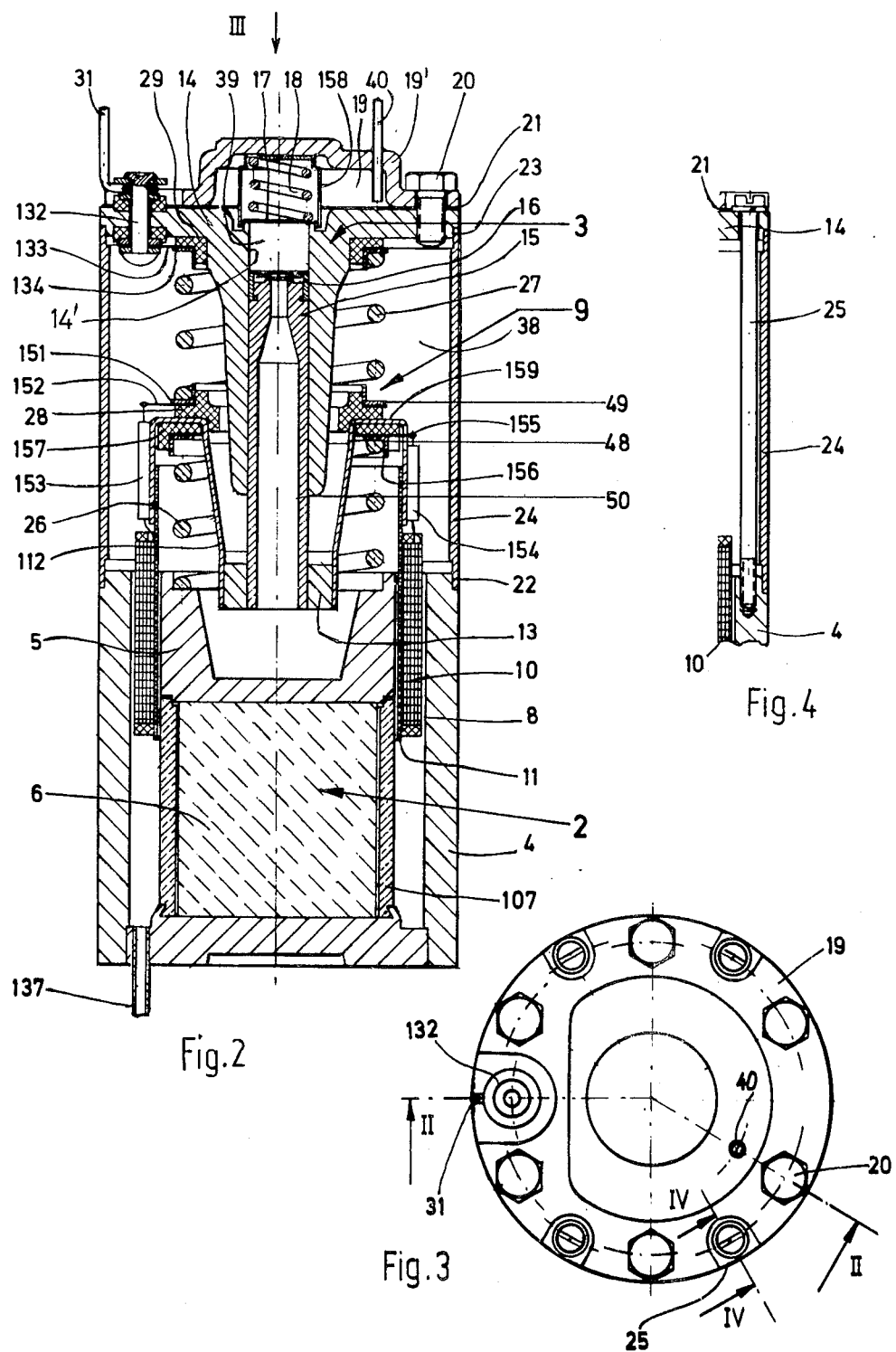

PLUNGER COMPRESSOR

BACKGROUND OF THE INVENTION

The present invention relates to an oscillatory electrodynamic compressor for use in for example small refrigerators or the like, comprising a coaxially arranged gas compression assembly and electromagnetic drive assembly.

In a known construction shown in German Patent publication DT-OS No. 23,17,038 corresponding to U.S. Pat. No. 3,903,438, the device comprises a closed housing and the electromagnetic drive assembly comprises a permanent magnet having concentrically arranged a cylindrical outer pole shoe and an inner pole shoe spaced to provide an air gap therebetween for the production of a generally radial force field. Arranged to freely move within the air gap is a coil, formed about a pot shaped carrier mounted at the end of a hollow plunger which is part of the compression assembly, which also includes a cylindrical member axially spaced from and fixed to the electromagnetic assembly. The plunger has a unidirectional suction valve at one end allowing passage of a fluid from the housing, while the cylinder assembly includes an axial bore supporting the plunger and a compression chamber communicating with it. A unidirectional discharge valve is interposed between the bore and the compression chamber whereby fluid compressed in the cylinder is discharged to the chamber under a given pressure. The pot shaped coil carrier is resiliently floated between a pair of axially opposed compression springs. One compression spring located on the magnet drive side of the carrier bears against one side of the carrier bottom and the inner magnet pole shoe while the other spring located on the compression side bears against the opposite side of the carrier bottom and the compression cylinder member. On application of an alternating current to the pot shaped coil an oscillating motion is set up between the magnet and coil which causes the coil to "plunge" axially into and out of the gap causing the plunger to reciprocate in the cylinder bore, sucking fluid from the housing, into the bore and subsequently discharging the fluid under pressure. The natural frequency of the oscillating system, comprising the springs, plunger, coil, gas spring rate, etc., is adjusted, to be at least approximately the frequency of the current supplied to the coil.

In the aforementioned device the pot shaped carrier is mounted at the extreme end of the plunger so that the coil extends fully between the outer cylinderical pole shoe and the inner pole shoe.

If there is no excitation current the two vibrating support spring maintain the coil in a center rest position in which the coil carrier is located at a distance from the compression cylinder member and particularly from the end of the cylinder bore as well as from the inner pole shoe. Correspondingly, the planes in which the vibrating springs bear against either side of the coil carrier bottom, are also located at a distance from the end of the cylinder which distance is larger than half the vibration amplitude or larger than half the vibration amplitude plus the distance of the two bearing planes from one another.

During the assembly the electromagnetic drive and the compressor must be exactly centered relative to one another in the same way as the coil, the coil carrier and the plunger must be exactly centered relative to one another to achieve a centric motion of the coil in the magnetic field. Due, however, to the design of the coil as a cylinder and due to the radial configuration of the magnetic force field in the annular gap the force exerted on the current carrying coil has an exact axial action according to the vector equation $P = Bxi.L$. To avoid any transverse forces which increase the friction of the plunger in the cylinder bore and thus result in an increased wear as well as in an increased energy consumption, the coil carrier portion extending into the magnetic field preferably consists completely of nonferromagnetic material so that there are only forces acting according to the above-mentioned equation. Consequently, transverse forces, i.e. forces having a component radially to the longitudinal axis of the entire system, may only be caused by the vibrating springs. Admittedly, hitherto the vibrating springs for the known device have been exactly selected for plane-parallelism of the end faces and for a centric force transmission. Nevertheless the occurrence of transverse forces could not be completely eliminated due to the anavoidable manufacturing tolerances and the design of such helical springs. These transverse forces generate a tilting moment acting on the plunger which, at a given transverse force, increases the longer the effective lever arm becomes. The lever arm is a function of the distance of the points of impact of the force on the coil carrier from the end of the cylinder bore. Consequently, the tilting moment attains its maximum value when the coil is extended to a maximum depth into the electromagnet. A plunger compressor is also known from German patent publication DT-OS No. 23 18 711 wherein only one single vibrating spring is provided which acts both as a tension and as a compression spring. One end of this vibrating spring is attached to the plunger end at the magnet side and the other end is attached to the inner pole shoe. For the minimization of the transverse forces the end of the vibrating coil is attached to axially arranged flexural bars by means of specially designed mounts, the vibrating spring being retained in an intermediate piece having some play and is soldered in this position. In this manner it is admittedly possible to keep the occurring transverse forces relatively small, but on the one hand the assembly of the arrangement is relatively complicated and, on the other hand, a deterioration of the spring quality as a result of the soldering operation is unavoidable. It is the object of the present invention to improve the device of the aforementioned type in such a manner that the occurring tilting moments leading to increased wear and increased energy consumption are reduced. At the same time it is an object of the invention to reduce the space requirements of the arrangement. The reduction of the tilting moments is of great importance with respect to the drive power demand because vibrating plunger or plunger compressors of this type are in many cases not supplied by the lighting or power mains, the energy consumption being of minor importance only, but systems of this type are frequently supplied by an accumulator having, of course, a limited capacity. Plunger compressors of this type are used as refrigerant compressors in small-scale cooling plants, in particular in mobile small-scale cooling plants.

THE PRESENT INVENTION

According to the invention the above-mentioned object is achieved by arranging the bearing planes of the vibrating springs in such a manner that they intersect the cylinder bore in which the plunger is guided at least beyond a considerable length of the vibration path. In this manner the practically complete elimination of the effect of the unavoidably remaining residual transverse forces is amazingly simple because almost no tilting moment is generated which causes plunger friction, and/or the resultant wear and loss in concomitant drive power input. This allows the construction of plunger compressors having two compression springs as vibrating support with the same low tilting moment as the known system having a single tension-compression spring but without having to accept the disadvantages concerning spring quality. Moreover, the invention results in a reduction of the volumetric size of the device which may be of a more compact construction, because the bearing planes of the two vibrating springs at the coil carrier interface are now shifted from the magnet closer to the compressor. The application of the steps according to the invention is not basically limited to drive systems operating according to the electrodynamic principle but their application to electromagnetic drive systems in which ferromagnetic parts are moved in the magnetic field would have no appreciable advantage because there are always considerable transverse forces due to the magnetic system so that the elimination of a small proportion of the total tilting moment would not have a striking effect. The tilting moments are completely eliminated if the bearing planes intersect the cylinder guide throughout the entire stroke. However, they are already considerably bearing planes intersect the cylinder bore throughout the entire stroke of the plunger. However, they are considerably reduced even if they intersect the cylinder guide only in a portion of the stroke, since a jamming effect by the canting due to the tilting moments shows an appreciable effect only above a given minimum value. This minimum value is far below the values of known plunger or vibrating plunger compressors.

The position of the bearing planes of the vibrating springs relative to the plunger can be freely selected within certain limits which are dependent on the design features. In a preferred embodiment of the invention the bearing plane of the vibrating springs at the interface with the coil carrier intersect the plunger approximately in the middle of its length. This results in a compact construction, on the one hand, and in a sufficient reduction of the tilting moments, on the other hand, since more than half the length of the plunger extends into the cylinder, even in the extended extreme position.

The design of the two bearing planes and the power transmission from the bearing planes to the plunger may be of a different shape. In a preferred embodiment of the invention the two bearing planes of the vibrating springs are located on either side of an annular flange of the coil carrier from the radially inner edge of which a first sleeve extends in the direction towards the magnet drive system, the drive-side end of said sleeve being rigidly connected to the plunger end protruding from the cylinder bore. From the radially outer edge of the coil carrier a second sleeve extends towards the drive system, a coil being rigidly connected to the drive-side end of said sleeve. This design of the coil carrier results in a lightweight, but nevertheless intrinsically very rigid structure which ensures the desired position of the bearing planes of the vibrating springs relative to the plunger and to the cylinder. Moreover, a coil carrier of this type can be manufactured with high accuracy and centrically connected to the plunger and coil, to form one single unit.

In preferred embodiments of the invention, the two vibrating springs are identical and their inside diameter is larger than the outside diameter of the first sleeve and their outside diameter is smaller than the diameter of the second sleeve. Due to the identical design of the two vibrating springs a larger production series and hence an economical production can be achieved.

In the case of the known plunger compressor devices with two vibrating springs the length of the entire compressor system including the drive mechanism is essentially determined by the length of the two springs. The total of the mounting length of the two springs is approximately equal to half the length of the entire device because the compressor component can largely be accommodated within the spring on the compressor side so that the total length of the system essentially results from the length of the driving magnet system plus the length of the two springs. A considerable reduction of the overall length of the whole system can therefore be achieved if the length of the springs can be reduced. Since the vibration behaviour of the plunger coil unit is not allowed to be changed, the total spring constant c (expressed in kp/mm) must be constant. The total spring constant is related to the two vibrating springs. In a particularly preferred embodiment, the vibrating spring on the compressor side has a smaller spring constant and hence a smaller overall length than the vibrating spring on the drive side and the bearing plane of the drive-side vibrating spring at the magnet system is deeply immersed between the pole shoes of the drive system. Due to these two measures the overall length of the plunger compressor can be appreciably reduced. The reduction of the compressor-side spring allows a displacement of the compressor towards the drive system; despite the extension of the drive-side vibrating spring the drive system may keep its position (relative to the coil carrier) because the bearing plane of said vibrating spring at the drive system is transposed away from the front face towards the center of the drive system.

In a further development of the invention the two vibrating springs may have different diameters and the bearing plane of the drive-side vibrating spring at the coil carrier is located closer to the compressor than the bearing plane of the compressor-side vibrating spring at the coil carrier. This means that the end portions of the two vibrating springs facing one another are "overlapping". Thus, a further reduction of the overall length of the plunger compressor can be achieved. In this connection, there is basically the option whether the compressor-side or the drive-side vibrating spring should have the smaller diameter. In a preferred embodiment it is provided that the compressor-side vibrating spring has a smaller diameter than the drive-side vibrating spring. In a further advantageous development of the invention this permits provision of an arrangement whereby the drive-side vibrating spring bears against an outer pole shoe of the magnet of the drive system. This has additional advantages if, as is known, the two vibrating springs are used for the power supply to the plunging coil. For this purpose, the compressor-side spring is generally insulated and the drive-side vibrating spring is used for the current feedback. In this connection, the drive-side vibrating spring and the drive system may be earthed. However, if a floating power supply to the plunging or vibrating coil is desired, the drive-side spring must also be insulated; this requirement can be much more easily realized and more reliably fulfilled if the drive-side vibrating spring is not located within but without the coil carrier and the plunging coil, a precondition of which is that the drive-side vibrating spring bears against the outer pole shoe of the magnet system. In this connection, the vibrating spring may also bear against the pole shoe in the vicinity of the front face plane or also to the front face plane in deeply recessed position.

In the embodiment described above the spring ends facing one another are not "overlapping" and the coil carrier, in the longitudinal section, has a U-shaped cross-section (twofold). In preferred embodiments in which the spring ends facing one another are "overlapping" the annular flange of the coil carrier, in the longitudinal section, has a Z-shaped cross-section and the bearing planes of the vibrating springs are located at the two end legs of the Z. For this purpose, the annular flange is not designed as a plane ring disk but as a ring disk which is offset in the axial direction. In this connection, the first sleeve still adjoins the internal diameter of the ring disk. The second sleeve may join the outer diameter of the offset ring disk if the drive-side vibrating spring bears against the inner pole shoe of the drive system. However, the second sleeve joins the ring disk (annular flange) in the area of the offset if the drive-side spring bears against the outer pole shoe of the magnet because in this case the coil is also located within the drive-side vibrating spring. Further details and embodiments of the present invention will become apparent from the following description of plunger compressors represented in the drawings in connection with the claims.

BRIEF DESCRIPTION OF THE DRAWINGS

In the drawings:

FIG. 1 shows a plunger compressor of a known type, in longitudinal section;

FIG. 2 shows a plunger compressor according to the invention, in longitudinal section taken along lines II—II of FIG. 3;

FIG. 3 shows a sectional view taken along the arrow III in FIG. 2; and

FIG. 4 shows a section taken along the line IV—IV in FIG. 3.

DESCRIPTION OF PREFERRED EMBODIMENT

As far as the relevant parts are unchanged, in FIGS. 2 through 4 the same reference numerals are used as in FIG. 1. Parts with corresponding functions, the design of which has been modified, are identified in FIG. 2 by a reference numeral increased by 100.

The hermetically enclosed plunger-compressor device represented in FIG. 1 comprises a gas-tight casing 1 in which an electrodynamic magnetic vibration drive mechanism 2 and a compressor 3 are accommodated.

The magnetic circuit of the vibration drive 2 comprises an outer pot-shaped pole shoe 4, an inner pole shoe 5 and a permanent magnet 6. The permanent magnet 6, with its two front pole faces, on the one hand, bears against the bottom of the pot-shaped outer pole shoe 4 and, on the other hand, against the front face of the cylindrical inner pole shoe 5. The pole shoes 4 and 5 consist of a ferromagnetic soft material and are fixedly braced with the permanent magnet 6 by means of a bolt 7 of a magnetically inactive material. The outer pole shoe 4 and the inner pole shoe 5 define an annular gap 8 which forms the air gap of the magnetic circuit and in which the magnetic flux generated by the permanent magnet 6 concentrates. In the annular gap 8 a plunging coil 9 of the vibrating drive 2 is guided in a contactless manner. The plunging coil 9 comprises a winding 10 made from copper wire which is applied on a coil carrier comprising a cylindrical coil former 11 to which the winding 10 is attached, for example, by means of potting. The coil former 11 is rigidly attached, for example, welded to a carrier bottom wall 12. Coil carrier former and bottom may consist of plastic material or non-ferromagnetic metal. The coil carrier bottom 12, in turn, is rigidly connected to a bushing 13, for example, by pressing in, hard soldering or welding, said bushing being rigidly attached to a hollow drilled plunger 15. The plunger 15 is guided in a cylinder bore 14' of a cylinder body 14 of the compressor 3 so that it is longitudinally displaceable and sealed.

A suction valve 16 provided at the front face of the longitudinally drilled plunger 15. In addition the compressor 3 comprises a pressure valve or discharge valve 17 which opens under the overpressure in the cylinder space formed in the bore and which is retained in the shut-off position by means of a pressure valve spring 18. The outlet of the pressure valve 17 opens into a pressure chamber 19 which, at the front face, joins the cylinder body 14 on the side facing away from the drive system. A cover 19' closes the pressure chamber 19 towards the outside and is secured to the cylinder body 14 by means of bolts 20 to form a gas- and pressure-tight seal by the interposition of a seal 21.

The outer pole shoe 4 and the cylinder body 14 are provided with centric openings 22 or 23 into which a spacer bushing 24 is inserted which ensures that the axes of annular gap 8, cylinder bore 14' and plunger 15 are exactly in alignment. Bolts 25 force a flange-like shoulder of the cylinder body 14 against the one face of the spacer bushing 24 and the outer pole shoe 4 against the other face of said spacer bushing and thus hold the magnet vibration drive system 2 and the compressor 3 together.

The plunging coil 9 which is rigidly connected to the coil carrier 12 and the bushing 13 which is attached in the coil carrier 12 are rigidly attached to the plunger 15 by forcing on of the bushing 13. Two vibrating springs 26 and 27 are designed as round wire helical compression springs and hold the plunging coil 9 and the plunger 15 in a center rest position between the two end positions of the overall plunger stroke. They are dimensioned so that, together with the gas spring mechanism of the refrigerant gas and the movable masses of the plunger, plunging coil and coil former they have a resonant frequency which is approximately equal to the resonant frequency of the supply current. The two vibrating springs 26 and 27 bear against two oppositely located sides of the coil carrier 12, whereas the two ends facing away from one another bear against the inner pole shoe 5, on the one hand, and against the flange of the cylinder 14, on the other hand. Furthermore, the alternating current feeding the winding 10 of plunging coil 9 is supplied via the vibrating springs 26 and 27. In this connection, the vibrating spring 26 is earthed, i.e. it is in immediate metallic contact with the inner pole shoe 5 which is electrically connected with the permanent magnet 6 and the outer pole shoe 4 and consequently also with the spacer bushing 24 and the cylinder body 14. However, the vibrating spring 27 is electrically insulated by means of intermediate rings 28 and 29 which are interposed between the vibrating spring 27 and the coil carrier 12 or the flange shoulder of the cylinder body 14. The current path leads from a alternating current power source which is not represented via an external feed-through line 30 inserted into the casing 1, an inner supply line 31, an internal feed-through line 32 penetrating the spacer bushing 24, a contact spring 33, a contact ring 34 inserted between the insulating intermediate ring 29 and the vibrating spring 27, the vibrating spring 27 and from the end of said spring at the coil carrier side via a wire bridge (not represented) to winding 10. From winding 10 a wire bridge which is also not represented leads to the end of the vibrating spring 26 on the coil carrier side which, as has already been mentioned, is earthed. From the earthed frame a return line which is not represented leads to the alternating current power supply source.

Due to the alternating current in the windinng 10 the magnetic flux in the annular gap 8 exerts axial forces on the plunging coil 9 and hence on piston 15, said forces respectively reversing their direction with the polarity change of the current.

The refrigerant to be conveyed which is in the gaseous phase passes through an external intake pipe 35 to an inner casing space 36 in the lower portion of which, adjoining the cover 19', an oil sump 44 is provided the oil level 43 of which is sufficiently high that an intake pipe 37 extends below the oil level 43 in the oil sump 44 when the compressor is not in operation. The intake pipe 37 is the only connection between the inner casing space 36 and an inner compressor space 38 which is enclosed and limited towards the outside by the spacer bushing 24, the flange shoulder of cylinder 14 and the pot-shaped outer pole shoe 4. Upon start-up the compressor initially draws in oil into the inner compressor space 38 until the oil level 43 has sufficiently dropped so that the lower end of the intake pipe 37 is free. It is only then that the effective delivery, i.e. the delivery of gaseous refrigerant, begins. During the period of oil suction and the following period during which an oil-gas mixture is delivered, an oil mist forms in the inner compressor space 38 which is sufficient for lubrication if a closed loop is used in which oil flows back from the cooling loop, whereby a steady oil level is ensured. The gaseous refrigerant drawn in through the intake pipe 37 into the inner compressor space 38 passes via openings (which are not represented in the drawings) in the coil former 11 and in the coil carrier 12 as well as through the annular gap 8 and through the longitudinally drilled plunger 15 during the suction stroke during which the suction valve 16 provided at the front face of plunger is opened. The drawn in gas enters a cylinder space 39 from where, during the compression stroke of plunger 15, it is expelled against the force of the pressure valve spring 18 into the downstream pressure chamber 19, while the pressure valve 17 is being opened. A pressure pipe 40 which penetrates the cover 19' is installed alongside the system within the casing 1 and attached at the outside to the pot bottom of the outer pole shoe 4. There, the pressure pipe 40 leads over to a pressure pipe coil 41 which leads to the outside through a pressure connection 42 penetrating the wall of casing 1. The pressurized gaseous refrigerant flows from the pressure chamber 19 through the pressure pipe 40, the pressure pipe coil 41, and the pressure connection 42 and from there to the refrigerant loop which is not represented and the outlet of which, in turn, is connected to the intake pipe 35.

The entire plunger compressor 45, together with the vibrating drive mechanism 2 and the compressor 3, is resiliently mounted within the casing 1 by means of two helical compression springs 46 and 47. The two helical compression springs bear against the front faces of casing 1, on the one hand, and against the cover 19' or the outside of the pot bottom of the outer pole shoe 4, on the other hand.

The vibrating springs 26 and 27 bear against the coil carrier 12 in the bearing planes 48 or 49. The end of the guide of plunger 15 in the cylinder bore 14' is defined by a plane 50 of the cylinder front face. The planes 48 or 49 are spaced from the plane 50 at the distances a or b. The distances a or b have their maximum value when the plunging coil 9 has reached the deepest immersion into the vibrating drive 2. The transverse forces which are inevitably transmitted from the vibrating springs 26 and 27 to the coil carrier 12 and which are directed transversally to the longitudinal axis exert a tilting moment on the plunger 15 the quantity of which is given by the product of the transverse force and distance $a$ or $b$. Under unfavourable circumstances, the tilting moment resulted in jamming or seizing of the plunger 15 in the cylinder bore 14', an incident which may occur despite precision production of the vibrating springs.

In the embodiment of a plunger compressor designed according to the invention (represented in FIG. 2), the resilient suspension in a gas-tight casing or in an enclosure is the same as shown in FIG. 1. A detailed representation has therefore not been included in the drawings. In the plunger compressor according to the invention represented in FIG. 2, a coil carrier 112 is provided which is not designed as an annular disk but as an annular disk-shaped flange 159 the radially inner and radially outer edge of which is respectively joined by a sleeve in the direction towards the vibrating drive 2. At the radially outer sleeve the coil former 11 together with the winding 10 is attached, whereas the radially inner sleeve which is of slightly conical design is attached to the bushing 13 which is connected to the plunger 15 in a known manner. Due to the slightly conical sleeve the flange 159 is sufficiently shifted towards the compressor so that the bearing planes 48 and 49 still intersect the cylinder bore 14' even in the two vibration end positions. Even if the bearing plane 48 or even the bearing plane 49 would no longer intersect the cylinder 14 within part of the stroke, the distances a and b would nevertheless be reduced to such an extent that only a negligeably small tilting moment would occur. As long as the planes 48 and 49 intersect the cylinder bore 14' there is practically no tilting moment. The attachment of the permanent magnet 6 to the inner pole shoe 5 and to the outer pole shoe 4 has also been changed. These three components are held together by the magnetic force of the permanent magnet 6. Centering is ensured by a sleeve 107.

Electric power is supplied via a feed line 132 which is inserted into the flange of the cylinder body 14. In the compressor space 38 the feed line 132 is joined by a contact disk 133 which leads to an abutting ring 134 which is inserted between the vibrating spring 27 and the insulating intermediate ring 29. On the other hand, the vibrating spring 27 rests on an abutting ring 151 which is supported by the insulating intermediate ring 28 and from which a contact disk 152 extends in a radial outward direction. Connected to the contact disk is a supply line 153 which, in turn, is led to the winding 10. Furthermore, from the other terminal of winding 10 a supply line 154 is led to the contact disk 155 which leads to an abutting 156 which is inserted between the vibrating spring 26 and an insulating intermediate ring 157. At the bottom of the annular space the insulating intermediate ring 157 bears against the flange 159 which is formed by the two sleeves adjoining the flange 159. The insulating intermediate ring 157 prevents a possible electrical shunt connection to the frame via the plunger 15 and the cylinder body 14 which could cause the formation of oil carbon.

The pressure valve 17 is guided in a pressure valve cage 158. This permits the use of a weaker design of the pressure valve spring 18, whereby a reduction of the operating noise and an increase of the discharge capacity is achieved. The intake pipe 37 has been replaced by an intake pipe 137 which is arranged in the pot bottom of the outer pole shoe 4.

It shall be understood that the present invention is not limited to the embodiment shown by way of example and that deviations from this embodiment are possible without exceeding the scope of the invention. In particular, individual features of the invention can be applied separately or combined in a plurality. For example, flange 158 may be profiled and vibrating springs of different diameters and different lengths may be used.

Having thus fully described my invention, what I claim as new and wish to secure by Letters Patent is:

1. An oscillatory electrodynamic compressor comprising a sealed housing having a fluid inlet and a fluid outlet and having located within said housing a permanent magnet formed by a pair of radially spaced pole shoes, a cylindrical electrically excitable coil axially movable between said pole shoes, a cylinder member arranged in tandem axially with said magnet having a longitudinally extending compression bore, a plunger reciprocable within said bore having an end extending outwardly toward said coil, means fixedly connecting said coil and said plunger for conjoint movement so that on excitation of said coil said plunger is caused to compress fluid within said bore, said plunger having fluid inlet valve communicating with said housing inlet and said bore having fluid discharge valve means operable upon the compression of fluid within said bore in communication with the housing outlet, said coil and connected plunger being resiliently supported by a pair of opposed springs, one of which bears against said connection means on the magnet side thereof and the other bears against said connection means on the compression side thereof, said connection means and said springs being formed so that in the absence of excitation of said coil the planes defined by the bearing of the springs against the connection means intersect the axis of the plunger within the length of the cylinder bore.

2. The oscillatory electrodynamic compressor according to claim 1, wherein said connection means comprises a cup shaped member having a central axially extending recess defining an interior wall spaced from the outer wall of said cup and extending coaxially therewith, said plunger being set within said recess and being connected at its end to the bottom thereof and said coil being formed on the outer wall.

3. The oscillatory electrodynamic compressor according to claim 1, wherein said connection means and said springs are arranged so that the bearing planes intersect the cylinder bore remote from the end of said bore facing said magnet.

4. The oscillatory electrodynamic compressor according to claim 1, wherein said connection means and said springs are arranged so that the bearing planes intersect the cylinder bore substantially at its middle.

5. The oscillatory electrodynamic compressor according to claim 1, wherein the intersection of the bearing planes lies substantially midway between the extreme ends of the stroke of said plunger on excitation of said coil.

6. The oscillatory electrodynamic compressor according to claim 1, wherein said connection means comprises a carrier formed by a radially extending annular flange located about the exterior of said cylindrical bore, an inner sleeve connected at one end to the inner peripheral edge of said flange and at the other end to the end of said plunger facing said magnet and a coaxial outer sleeve connected at one end to the outer peripheral edge of said flange and at the other end to said coil, the springs bearing respectively against the opposing surfaces of the flange.

7. The oscillatory electrodynamic compressor according to claim 6, wherein the springs are identical and their inside diameter is larger than the outside diameter of the first sleeve and their outside diameter is smaller than the diameter of the second sleeve.

8. The oscillatory electrodynamic compressor according to claim 6, wherein the spring on the compressor side has a smaller spring constant and a correspondingly smaller overall length than the spring on the magnet side and the bearing plane of the end of the magnet side spring remote from the connecting means is deeply sunk into a pole shoe of the drive system.

9. The oscillatory electrodynamic compressor according to claim 6, wherein the springs have different diameters and the bearing plane of the spring on the magnet side is located closer to the compressor than the bearing plane of the compressor-side vibrating spring.

10. The oscillatory electrodynamic compressor according to claim 9, wherein the spring on the compressor side has a smaller diameter than the spring on the magnet side.

11. The oscillatory electrodynamic compressor according to claim 9, wherein the spring on the magnet bears against the outer pole shoe of the magnet.

12. The oscillatory electrodynamic compressor according to claim 9, wherein the annular flange of the coil carrier, in the longitudinal section, has a Z-shaped cross-section and the bearing planes of the two vibrating springs are located on the two end legs of the Z-section.

* * * * *